United States Patent [19]

Shioyama

[11] Patent Number: 5,023,792
[45] Date of Patent: Jun. 11, 1991

[54] SYSTEM AND METHOD FOR CONTROLLING VEHICLE SPEED TO CRUISE AT DESIRED SPEED FOR VEHICLE

[75] Inventor: Giichi Shioyama, Isezaki, Japan

[73] Assignee: Nissan Motor Company, Limited, Japan

[21] Appl. No.: 330,257

[22] Filed: Mar. 29, 1989

[30] Foreign Application Priority Data

Mar. 31, 1988 [JP] Japan .................... 63-76172

[51] Int. Cl.⁵ .............................. B60K 31/00
[52] U.S. Cl. .............. 364/426.04; 364/424.1; 180/179
[58] Field of Search ........ 364/426.04, 424.1, 424.01, 364/431.07; 180/170, 176, 179; 74/864, 866; 123/352

[56] References Cited

U.S. PATENT DOCUMENTS

| | | | |
|---|---|---|---|
| 3,070,185 | 12/1962 | Fales | 180/176 |
| 4,505,357 | 3/1985 | Pfalzgraft et al. | 180/335 |
| 4,569,425 | 2/1986 | Kenny et al. | 192/3 T |
| 4,646,861 | 3/1987 | Kawata et al. | 180/176 |
| 4,829,437 | 5/1989 | Suzuki et al. | 364/426.04 |
| 4,829,438 | 5/1989 | Etoh | 364/426.04 |
| 4,833,612 | 5/1989 | Okuno et al. | 364/426.04 |
| 4,834,045 | 5/1989 | Imai et al. | 123/352 |
| 4,835,696 | 5/1989 | Suzuki et al. | 364/426.04 |
| 4,845,621 | 7/1989 | Kawata et al. | 364/426.04 |
| 4,845,622 | 7/1989 | Suzuki et al. | 364/426.04 |
| 4,855,918 | 8/1989 | Gray | 364/426.04 |
| 4,865,348 | 9/1989 | Hano et al. | 280/707 |
| 4,873,637 | 10/1989 | Braun | 364/424.1 |
| 4,879,657 | 11/1989 | Tamura et al. | 364/431.07 |
| 4,905,153 | 2/1990 | Suzuki et al. | 364/426.04 |
| 4,908,764 | 3/1990 | Etoh | 364/426.04 |
| 4,922,428 | 5/1990 | Takahashi | 364/426.04 |
| 4,926,334 | 5/1990 | Suzuki et al. | 364/426.04 |
| 4,964,048 | 10/1990 | Tanaka | 364/426.04 |

FOREIGN PATENT DOCUMENTS

| | | |
|---|---|---|
| 0106011 | 5/1983 | European Pat. Off. |
| 3721605 | 1/1988 | Fed. Rep. of Germany |
| 61-36024 | 2/1986 | Japan |

Primary Examiner—Thomas G. Black
Attorney, Agent, or Firm—Lowe, Price, Leblanc, Becker & Shur

[57] ABSTRACT

A system and method for automatically controlling a vehicle speed to a desired cruise speed are disclosed in which an operation of the automatic vehicle speed controlling system is inhibited when any one of the following conditions is established. That is to say, (1) the vehicle speed is below a predetermined speed value; (2) a gear position of a vehicular transmission is in a low-speed gear range or reverse gear range; (3) an opening angle of a throttle valve is below a predetermined angle value; (4) a time for which the vehicle speed is above the predetermined speed value is continued within a predetermined time; (5) a time is within a predetermined time from a time at which the gear position is placed in a neutral position to a time at which the gear position is placed in a drive range; (6) it is within a predetermined time upon the drive to produce the operating variable of the engine speed adjusting mechanism; and (7) with no operation of the mechanism linked to the engine speed adjusting mechanism and with the operation of the brake mechanism, the operating variable of the engine speed adjusting mechanism is above the predetermined value.

14 Claims, 5 Drawing Sheets

SYSTEM AND METHOD FOR CONTROLLING VEHICLE SPEED TO CRUISE AT DESIRED SPEED FOR VEHICLE

BACKGROUND OF THE INVENTION (1) Field of the Invention

The present invention relates generally to a system and method for controlling a vehicle speed to cruise at a desired speed for a vehicle.

(2) Description of the Background Art

Various types of automatic vehicle speed controlling system and method have been proposed which render the vehicles automatically run at a constant cruise speed without manual operations of accelerator pedals.

In vehicles in which the automatic vehicle speed controlling systems are mounted, e.g., during run on a freeway, a set switch is provided to set the vehicle speed to a desired cruise speed when a driver operates the set switch during run of the vehicle at a vehicle speed at which the vehicle cruises. Then, the controlling system automatically adjusts an opening angle of an engine throttle valve to enable the constant cruise at a constant speed. Since the driver is not needed to depress the accelerator pedal at all times, it is convenient for the driver to run the vehicle.

However, in the controlling system described above, such unfavorable cases described below may often occur. For example, the vehicle does not run at the desired target speed during the cruise run using the automatic vehicle speed controlling system depending on external operating conditions around a control unit in the controlling system, e.g., the actual running speed often becomes lower than the target speed.

SUMMARY OF THE INVENTION

It is an object of the present invention to provide a system and method for controlling a vehicle speed to a desired cruise speed which can perform an appropriate control of the vehicle speed controlling system according to external operating conditions around the controlling system.

The above-described object can be achieved by providing a system for automatically controlling a vehicle speed to a desired cruise speed, comprising: a) a control apparatus for controlling the vehicle to run at a target cruise speed in a feedback control mode such that an operating variable of an engine speed adjusting mechanism installed in a vehicular engine is controlled so that a feedback actual vehicle speed coincides with the target vehicle speed; b) first means for detecting the operating variable of the engine speed adjusting mechanism; c) second means for detecting whether a mechanism linked to the engine speed adjusting mechanism is manipulated; d) third means for detecting the actual vehicle speed; e) fourth means for detecting a gear position of a vehicular transmission; f) fifth means for detecting whether a vehicular brake mechanism is manipulated; (g) sixth means for determining whether any one of the following conditions is established and halting the operation of the control apparatus when determining that any one of the following conditions is established, the conditions being that (1) the vehicle speed is below a predetermined speed value, (2) the gear position of the transmission is placed in a low-speed gear range or in a reverse range, (3) the operating variable of the engine speed adjusting mechanism is small and is below a predetermined value, (4) a time for which the vehicle speed continues at a speed above the predetermined speed value is continued within a predetermined time, (5) it is within a first predetermined time from a time at which the gear position is placed in a neutral range position to a time at which the gear position is placed in a drive range position, (6) it is within a second predetermined time upon the drive to produce the operating variable of the engine speed adjusting mechanism, and (7) with no operation of the mechanism linked to the engine speed adjusting mechanism and with the operation of the brake mechanism, the operating variable of the engine speed adjusting mechanism is above the predetermined value.

The above-described object can also be achieved by providing a method for automatically controlling a vehicle speed to a desired cruise speed, comprising: a) controlling the vehicle to run at a target cruise speed in a feedback control mode such that an operating variable of an engine speed adjusting mechanism installed in a vehicular engine is controlled so that an actual vehicle speed coincides with the target vehicle speed; b) detecting the operating variable of the engine speed adjusting mechanism; c) detecting whether a mechanism linked to the engine speed adjusting mechanism is manipulated; d) detecting the actual vehicle speed; (e) detecting a gear position of a vehicular transmission; f) detecting whether a vehicular brake mechanism is manipulated; g) determining whether any one of the following conditions is established and halting the operation of the control apparatus when determining that any one of the following conditions is established, the conditions being that (1) the vehicle speed is below a predetermined speed value, (2) the gear position of the transmission is placed in a low-speed gear range or in a reverse range, (3) the operating variable of the engine speed adjusting mechanism is small and is below a predetermined value, (4) a time for which the vehicle speed is above the predetermined speed value is continued within a predetermined time, (5) it is within a first predetermined time from a time at which the gear position is placed in a neutral position to a time at which the gear position is placed in a drive range, (6) it is within a second predetermined time upon the drive to produce the operating variable of the engine speed adjusting mechanism, and (7) with no operation of the mechanism linked to the engine speed adjusting mechanism and with the operation of the brake mechanism, the operating variable of the engine speed adjusting mechanism is above the predetermined value.

The above-described object can also be achieved by providing a system for automatically controlling a vehicle speed to a desired cruise speed, comprising: a) a control apparatus for controlling the vehicle to run at a target cruise speed in a feedback control mode such that an operating variable of an engine speed adjusting mechanism installed in a vehicular engine is controlled so that an actual vehicle speed coincides with the target vehicle speed; b) first means for detecting the operating variable of the engine speed adjusting mechanism; c) second means for detecting whether a mechanism linked to the engine speed adjusting mechanism is manipulated; d) third means for detecting the actual vehicle speed; e) fourth means for detecting a gear position of a vehicular transmission; f) fifth means for detecting whether a vehicular brake mechanism is manipulated; and g) sixth means for determining whether any one of the following conditions is established and halting the operation of the control apparatus when determining that any one of the following conditions is established, the conditions being that (1) the vehicle speed is below a predetermined speed value, (2) the gear position of the transmission is placed in a shift range except a high-speed gear range, (3) the operating variable of the engine speed adjusting mechanism is small and is below a predetermined value, (4) a time for vehicle speed is above the predetermined speed value is continued within a predetermined time, (5) it is within a first predetermined time from a time at which the gear position is placed in a neutral position to a time at which the gear position is placed in a range except a reverse range, low-speed gear range, and a parking range, (6) it is within a second predetermined time upon the drive to produce the operating variable of the engine speed adjusting mechanism, and (7) with no operation of the mechanism linked to the engine speed adjusting mechanism and with the operation of the brake mechanism, the operating variable of the engine speed adjusting mechanism is above the predetermined value.

BRIEF DESCRIPTION OF THE DRAWINGS

FIG. 2 (B) is an explanatory view for explaining operations of the actuator control portion shown in FIG. 1.

FIG. 5 (B) is a graph representing a relationship between an opening angle of a throttle valve and vehicle speed with shift ranges of a transmission of a vehicle as parameters.

DETAILED DESCRIPTION OF THE PREFERRED EMBODIMENTS

Reference will hereinafter be made to the drawings in order to facilitate understanding of the present invention.

Figure 1:
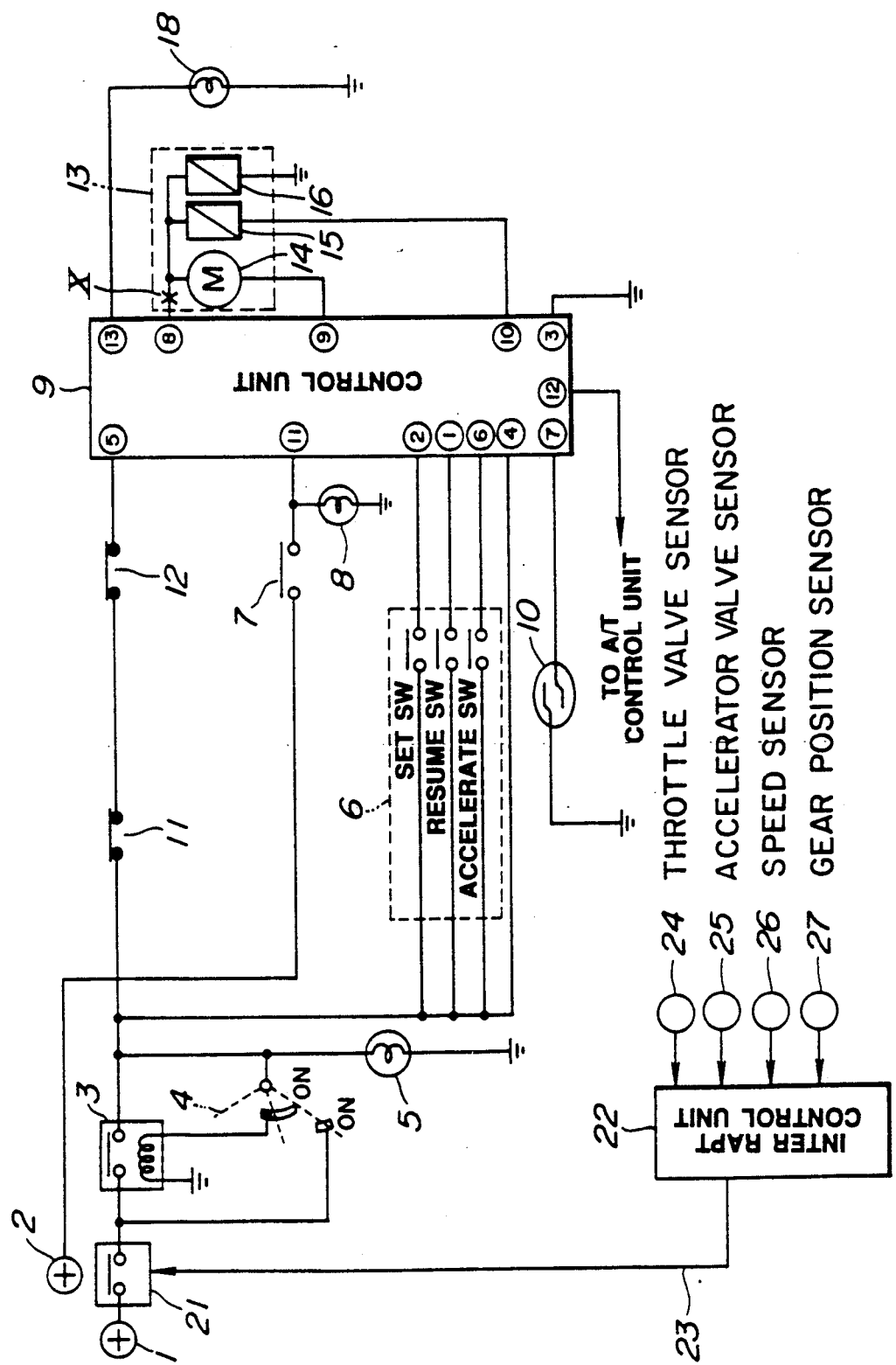
FIG. 1 is a schematic circuit block diagram of a system for automatically controlling a vehicle speed to a desired cruise speed in a preferred embodiment according to the present invention.
Figure 2:
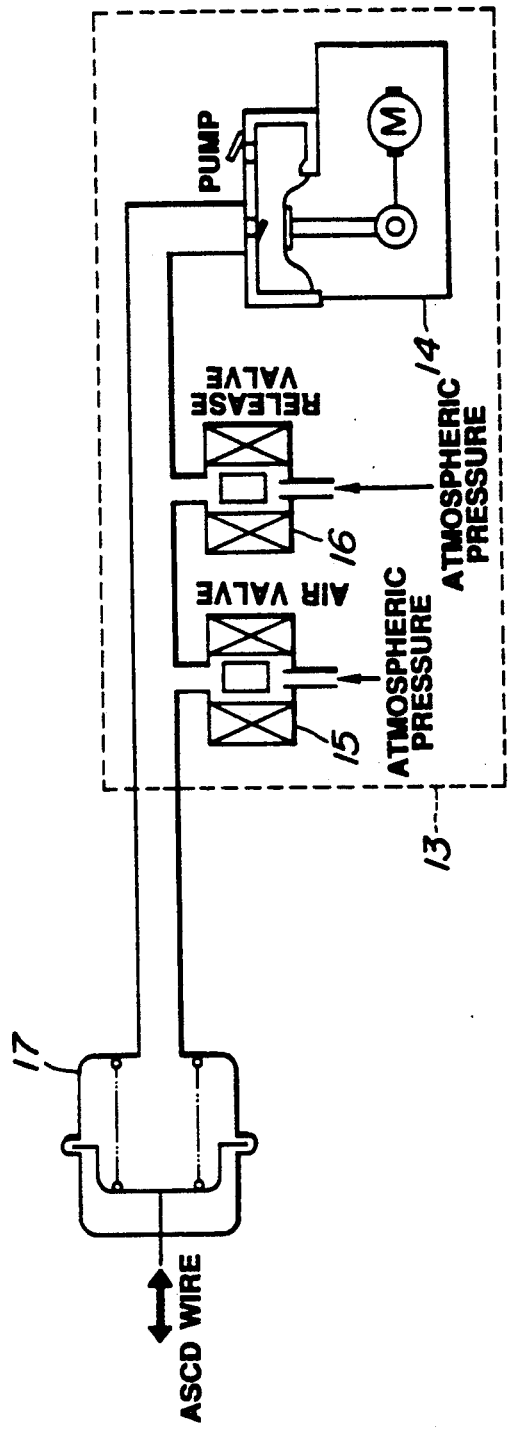
FIG. 2 (A) is a schematic drawing of an actuator control portion in the automatic vehicle speed controlling system shown in FIG. 1.

FIG. 1 shows an automatic vehicle speed controlling system in a preferred embodiment according to the present invention.

In FIG. 1, numerals 1 to 18 denote components of the automatic vehicle speed controlling system in the preferred embodiment, i.e., an ASCD (Automatic Speed Control Device).

A power supply terminal 1 is connected to a battery via an ignition switch not shown and fuse. In addition, a switching element 21 is turned to ON in a case where the automatic vehicle speed controlling system is in the normal operation (the detailed explanation will be described later). In addition, when an ASCD relay 3 is energized when a main switch 4 of the ASCD is turned on, its contact is turned on. A battery not shown is connected to an operation circuit 6 via the switching element 21 and contacts of the ASCD relay 3. Furthermore, the battery is connected to a control unit 9 via an inhibit switch 11 and brake switch 12. Hence, when the switching element 21 is operated normally (turned on), the power supply is connected to the automatic vehicle speed controlling system with the main switch 4 turned on and the contacts of the ASCD relay 3 turned on. Thus, in such a state as described above, the main lamp 4 is illuminated to indicate that the automatic vehicle speed controlling system is in operation.

On the other hand, the battery is connected to a power supply terminal 2 via an ignition switch and fuse (not shown). The power supply terminal 2 is connected to a control unit 9 via a stop lamp switch 7 which is turned on when a brake pedal is depressed. When the switch 7 is turned on, a stop lamp 8 is illuminated. Hence, if the brake pedal is depressed, the stop lamp switch 7 is turned on so that an information that the brake pedal operation is transmitted to the control unit 9.

An operation of the operation circuit 6 will be described below.

The operation circuit 6 is installed in a steering wheel portion with an operability taken into account. The operation circuit 6 is connected to the control unit 9 via a slip ring provided in a rotation portion of the steering wheel, i.e., a slidable contact. The operation circuit 6 is constituted by a set switch, accelerate switch, and resume switch, each one end of which is connected to a battery via the ASCD relay 3. In addition, the other end of each switch is connected independently to the control unit 9.

Next, the functions of the set switch, accelerate switch, and resume switch will be described below.

First, the set switch is a switch for setting the cruise run of the vehicle at a set target speed. For example, when the vehicle runs at 60 Km/h, the set switch is temporarily closed so that the cruise run of the vehicle speed at 60 Km/h is thereafter continued. In the cruise run described above, the set switch is further continued to turn on so that the vehicle speed is gradually reduced due to an engine brake. That is to say, the set switch also functions as a coast switch.

The accelerate switch has a function to accelerate the vehicle. When, during the cruise run state, the accelerate switch is continued to be closed, the vehicle speed is gradually increased. Thereafter, when the accelerate (acceleration) switch is open, the cruise run is executed at the vehicle speed at the time when this switch is released.

A resume switch is a switch for increasing the vehicle speed gradually when the switch is operated (turned on) to reset the vehicle speed to a cruise run state at a previous cruise speed stored in a memory means, e.g., at 60 Km/h. The resume switch is effective after the cruise run state is temporarily cancelled by means of an operation of the brake pedal.

Next, since the vehicle speed sensor 10 is connected to the control unit 9, the vehicle speed information according to the vehicle speed is transmitted to the control unit 9. The vehicle information according to the run speed of the vehicle speed is transmitted to the control unit 9. For example, since switching means for opening and closing according to the vehicle speed is incorporated into the speed sensor 10, the open and close operations become faster as the vehicle speed is increased. An intermittent signal generated due to the open and close operations of the switching means of the speed sensor 10.

In addition, as described above, the power supply terminal 1 is connected to the control unit 9. An inhibit switch 11 is turned off in a case when a gear range selection lever of an automatic transmission is placed in a parking range position P or neutral range position N and is placed when the gear range selection lever of the automatic transmission is placed in other ranges (drive range D, reverse range R, or 1st or 2nd range). On the other hand, the brake switch 12 is turned off when the brake pedal is depressed.

When at least one of the inhibit switch 11 and brake switch 12 is turned off, the cruise control by means of the control unit 9 is released.

(It is noted that the structures and functions of the set switch, resume switch, and accelerate switch are also exemplified by U.S. Pat. Application Ser. No. 055,516 filed on May 29, 1987, the disclosure of which is hereby incorporated by reference.)

The control unit 9 includes a microcomputer executing various control processings on the cruise run. The microcomputer includes a CPU (Central Processing Unit), RAM (Random Access Memory), ROM (Read Only Memory), common bus, and I/O Port. The microcomputer stores information on the cruise run of the vehicle, determines the vehicle speed on the basis of the speed information derived from the vehicle speed sensor 10, and outputs various kinds of control signals on the basis of each information derived from the operation circuit 6 and vehicle speed sensor 10.

For example, when the microcomputer determines that the set switch has been operated on the basis of information of the vehicle speed derived from the operation circuit 6, the vehicle speed is calculated and stored into the storing means of the microcomputer at the time when the set switch is operated. Then, the microcomputer outputs the control signal that the vehicle speed is transferred to the cruise run state on the basis of the speed information from the vehicle speed sensor 10. In addition, the control unit 9 outputs the control signal so that the vehicle speed is gradually increased at a predetermined rate upon the operation of the accelerate switch.

When the microcomputer determines that the vehicle runs after the temporary release of the vehicle cruise by means of the operation of brake switch 12 caused by the brake operation, the speed information read in the storage means is read. Then, the microcomputer outputs the control signal so that the vehicle is returned to the original cruise run state on the basis of the speed information.

Next, an actuator control portion 13 will be described with reference to FIGS. 3 (A) and 3 (B).

Figure 3:
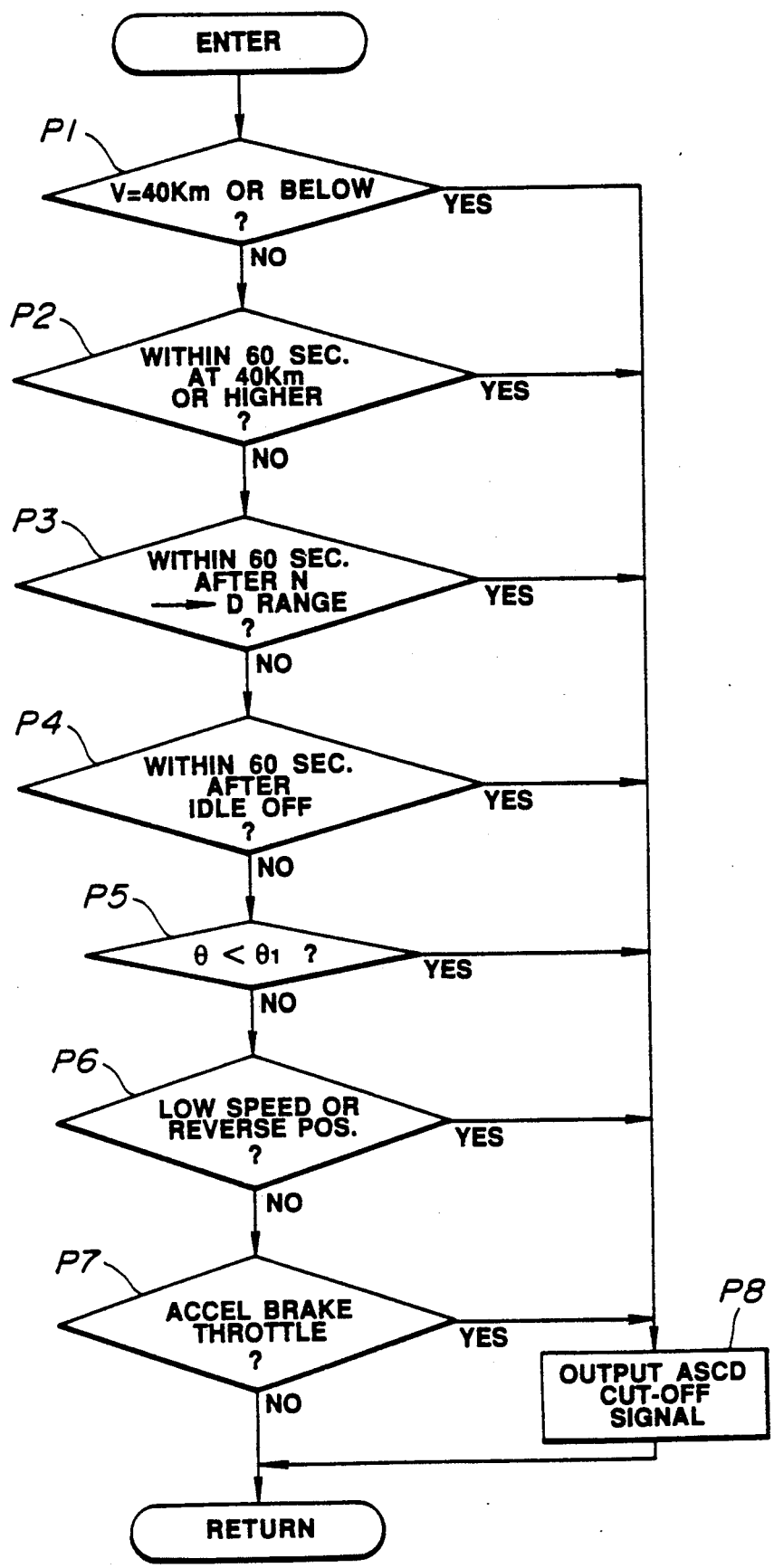
FIG. 3 is an operational flowchart indicating the contents of arithmetic operations executed by a control unit in the preferred embodiment shown in FIG. 1.

As shown in FIG. 3 (A), the actuator control portion 13 is constituted by a negative pressure pump 14, air valve 15, and release valve 16.

The operations of the negative pressure pump 14, air valve 15, and release valve 16 are controlled as shown in FIG. 3 (B) according to the control signal derived by the control unit 9. A desired negative pressure is generated to operate an actuator 17 (negative pressure valve) due to its negative pressure.

It is noted that as shown in FIG. 3 (B) during the non-operation of the cruise speed control the negative pressure pump 14 is stopped, both air valve 15 and release valve 16 are always open, and the actuator 17 becomes under the atmospheric pressure. Thus, an operating variable of the actuator indicates zero.

In addition, during the operation of the cruise run control, the operation of the negative pressure pump 14 is controlled according to the relationship between the target vehicle speed and actual vehicle speed. Both air valve 15 and release valve 16 are opened and closed so that the operating variable of the actuator 17 is controlled, The actuator 17 is connected to an engine throttle valve (not shown) via an ASCD wire. An opening angle of the throttle valve is adjusted according to the operating variable of the actuator 17. Consequently, the vehicle speed is controlled to reach and maintain the desired target vehicle speed as described above.

A cruise lamp 18 is illuminated in response to the signal derived from the control unit 9, indicating that the vehicle is at the cruise run state.

A throttle valve opening angle sensor 24 is connected to another control unit 22 for sensing the opening angle of the throttle valve and outputting the sensed signal according to the opening angle of the throttle valve (constituted by a potentiometer).

An accelerator pedal sensor 25 is connected to the other control unit 22 for detecting whether the accelerator pedal is depressed.

Figure 4:
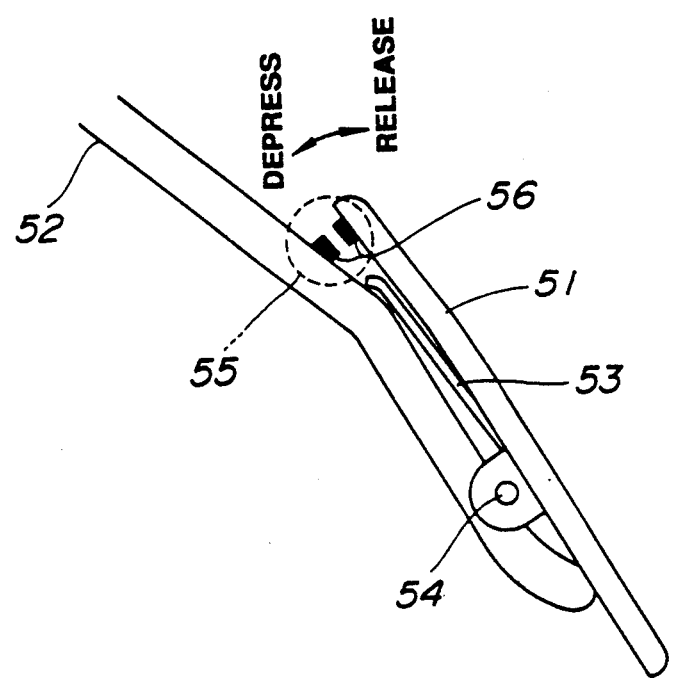
FIG. 4 is a schematic drawing of an example of an accelerator link used in the preferred embodiment shown in FIG. 1.

The structure of the accelerator pedal sensor 25 is exemplified by FIG. 4.

The accelerator pedal is connected to the throttle valve via an accelerator link 52. When a driver depresses an accelerator pad 51, an accelerator link 52 is displaced so that the throttle valve is opened. At this time, an upper portion of the pad 51 is pressed in a leftward direction with a fulcrum 54 as a center so that a contact 56 of the switch 55 is closed. When a foot of the driver is released from an accelerator pedal pad 51, a reaction force of a return spring 53 intervened between the pad 51 and link 52 causes the pad 51 to move in the rightward direction so that the contact 56 is open.

Hence, the sensor 25 can detect whether the pedal is depressed regardless of the opening angular position of the throttle valve.

Numeral 26 shown in FIG. 1 denotes the vehicle speed sensor which is the same or similar to the vehicle speed sensor 10.

Numeral 27 denotes a gear position sensor for detecting the gear position of an automatic transmission. The gear position sensor 27 may be constituted by a switch which opens and closes according to the selected position of the gear shift lever.

It is noted that the position of the gear lever can be derived from a calculation based on the relationship between the vehicle speed and engine speed or opening angle of the throttle valve. That is to say, as shown in FIG. 5 (A), since a constant relationship exists between the engine speed and vehicle speed according to the gear position in the case of the automatic transmission, the gear position can be detected from both values of the engine speed and vehicle speed.

Figure 5A:
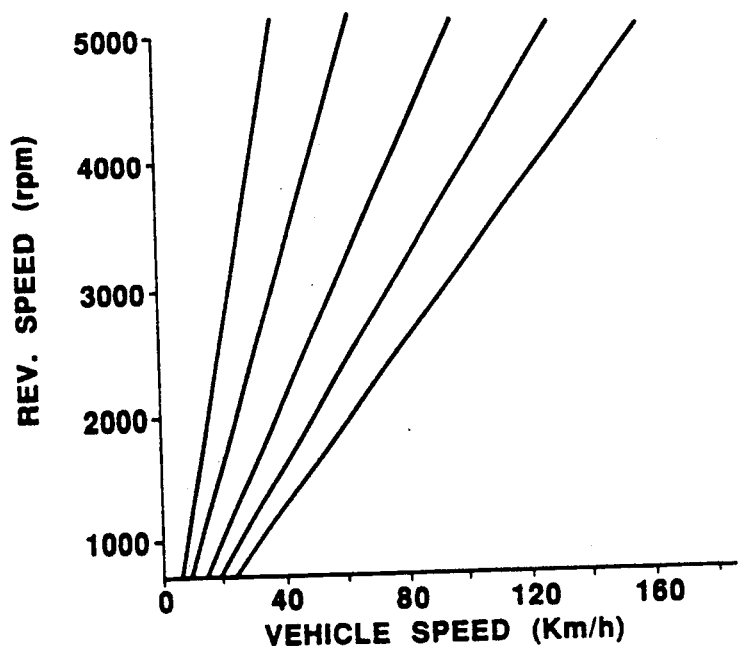
FIG. 5 (A) is a graph representing a relationship between a speed of engine revolutions (RPM) and vehicle speed (Km/h).
Figure 5B:
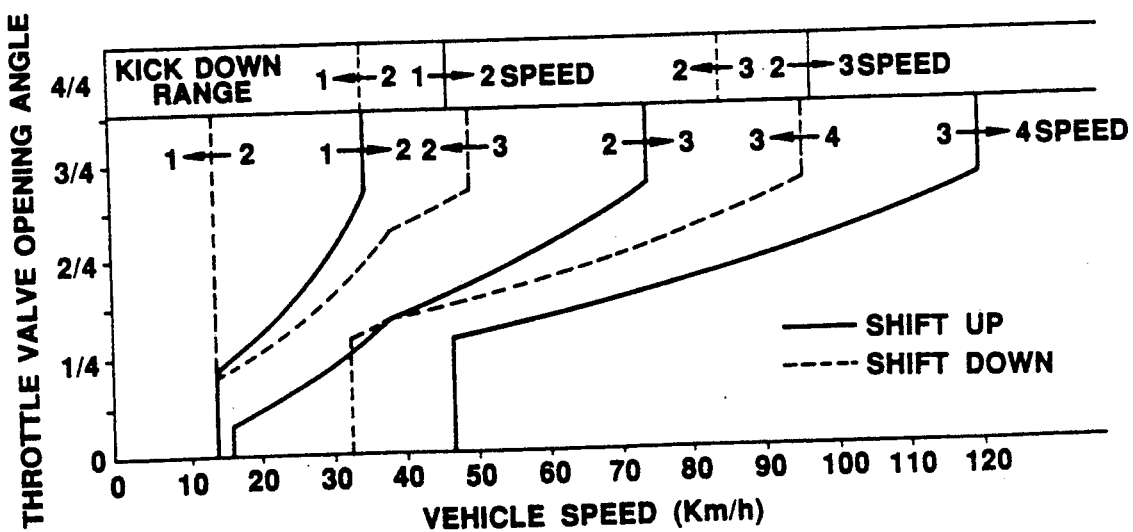

In addition, in the case of the automatic transmission shown in FIG. 5 (B), the corresponding relationship exists between the opening angle of the throttle valve and vehicle speed. Therefore, the gear position can be derived from both values of opening angle and vehicle speed.

The control unit 22 is constituted by a self-contained analog circuit, a self-contained digital circuit, or microcomputer receiving the sensed signals from the above-described sensors 24 to 28. The control unit 22 executes calculations of conditions to be described later, and outputs an ASCD cut-off signal when the conditions are met.

The switching element 21 is constituted by a relay (or analog switch) which is usually turned on. When the ASCD cut-off signal is issued, the switching element 21 is turned off in response to the ASCD cut-off signal.

When the switching element 21 is turned off, the power supply to the automatic vehicle speed controlling system, i.e., the control unit 9 is interrupted in the same way as the turn-off of the main switch 4. The operation of the cruise controlling system is stopped.

It is noted that in place of the switching element 21, another switching element connected to the ground and intervened at a position denoted by x may be interposed between the output terminal 8 of the control unit 9, and a junction to the actuator control portion 13. Furthermore, the switch may be used which turns off the power supply of the actuator control portion 13.

FIG. 3 shows an operational flowchart of a preferred embodiment of condition calculations in the case where the control unit 22 is constituted by the microcomputer. The operational flowchart shown in FIG. 3 is executed whenever a predetermined period of time has passed.

In a step $P_1$, the control unit 22 determines whether the vehicle speed is below a predetermined speed value (,e.g., 40 Km/h).

In a step $P_2$, the control unit 22 determines whether the continuation time in which the vehicle speed is above the predetermined speed value is within a predetermined time (,e.g., 60 seconds).

In a step $P_3$, the control unit 22 determines whether a predetermined time has passed from a time at which the gear position of the transmission is placed in a neutral range (or neutral or parking gear range) to a time at which the transmission position is placed in a drive range (or 1st to 3rd range and reverse range position).

In a step $P_4$, the control unit 22 determines whether the predetermined time (,e.g., 60 seconds) has passed after the throttle valve is opened from an idling position (,i.e., a fully closed position).

In a step $P_5$, the control unit 22 determines whether the opening angle 0 of the throttle valve is below a predetermined angle value $\theta_1$ (e.g., a value corresponding to the vehicle speed of 40 Km/h).

In a step $P_6$, the control unit 22 determines whether the gear position of the transmission is placed at a low-speed gear position (1st speed or 2nd speed) or reverse gear position.

In a step $P_7$, the control unit 22 determines whether the brake pedal is depressed with no depression of the accelerator pedal and opening angle of the throttle valve is above the predetermined value.

If, in the determinations of the routine described above, any one of those determinations answers YES, the routine goes to a step $P_8$ in which the ASCD cut-off signal is outputted to halt the operation of the control unit 9. If all NO, the routine returns to the step $P_1$.

The control unit 22 may be constituted by another microcomputer used for controlling a fuel injection start and quantity.

As described hereinabove, since, in the system and method for automatically controlling the vehicle speed according to the present invention, the vehicle run state corresponds to any one of the conditions described in the steps $P_1$ to $P_7$ and the operation of the automatic speed controlling system is forcefully stopped, the control operability can be improved.

It will fully be appreciated by those skilled in the art that the foregoing description has been made in terms of the preferred embodiments and various changes and modifications may be made without departing from the scope of the present invention which is to be defined by the appended claims.

What is claimed is:

1. A system for automatically controlling a vehicle speed to a desired cruise speed, comprising:
   a) a control apparatus for controlling the vehicle to run at a target cruise speed in a feedback control mode such that an operating variable of an engine speed adjusting mechanism installed in a vehicular engine is controlled so that an actual vehicle speed coincides with the target vehicle speed,
   b) first means for detecting the operating variable of the engine speed adjusting mechanism;
   c) second means for detecting whether a mechanism linked to the engine speed adjusting mechanism is manipulated;
   d) third means for detecting the actual vehicle speed;
   e) fourth means for detecting a gear position of a vehicular transmission;
   f) fifth means for detecting whether a vehicular brake mechanism is manipulated; and
   g) sixth means for determining whether any one of the following conditions is established and halting the operation of the control apparatus when determining that any one of the following conditions is established, the conditions being that (1) the vehicle speed is below a predetermined speed value, (2) the gear position of the transmission is placed in a low-speed gear range or in a reverse range, (3) the operating variable of the engine speed adjusting mechanism is small and is below a predetermined value, (4) a time for which the vehicle speed is above the predetermined speed value is continued within a predetermined time, (5) it is within a predetermined time from a time at which the gear position is placed in a neutral position to a time at which the gear position is placed in a drive range, (6) it is within a predetermined time upon the drive to produce the operating variable of the engine speed adjusting mechanism, and (7) with no operation of the mechanism linked to the engine speed adjusting mechanism and with the operation of the brake mechanism, the operating variable of the engine speed adjusting mechanism is above the predetermined value.

2. A system as set forth in claim 1, wherein the sixth means interrupts a power supply to the control apparatus when any one of the conditions is established.

3. A system as set forth in claim 2, wherein the sixth means includes a microcomputer and a switching element connected between a vehicular battery and an ASCD relay contact connected to the control apparatus, the microcomputer producing a drive signal to the switching element to open the switching element when any one of the conditions is established.

4. A system as set forth in claim 1, wherein the fifth means includes a brake switch connected between the control apparatus and ASCD relay which opens when the brake mechanism is manipulated. A method for automatically controlling a vehicle speed to a desired cruise speed, comprising:

(a) controlling the vehicle to run at a target cruise speed in a feedback control mode such that an operating variable of an engine speed adjusting mechanism installed in a vehicular engine is controlled so that an actual vehicle speed coincides with the target vehicle speed;

(b) detecting the operating variable of the engine speed adjusting mechanism;

(c) detecting whether a mechanism linked to the engine speed adjusting mechanism is manipulated, (d) detecting the actual vehicle speed, (e) detecting a gear position of a vehicular transmission;

(f) detecting whether a vehicular brake mechanism is manipulated, and (g) determining whether any one of the following conditions is established and halting the operation of the control apparatus when determining that any one of the following conditions is established, the conditions being that (1) the vehicle speed is below a predetermined speed value, (2) the gear position of the transmission is placed in a low-speed gear range or in a reverse range, (3) the operating variable of the engine speed adjusting mechanism is small and is below a predetermined value, (4) a time for which the vehicle speed is above the predetermined speed value is continued within a predetermined time, (5) it is within a predetermined time from a time at which the gear position is placed in a neutral position to a time at which the gear position is placed in a drive range, (6) it is within a predetermined time upon the drive to produce the operating variable of the engine speed adjusting mechanism, and (7) with no operation of the mechanism linked to the engine speed adjusting mechanism and with the operation of the brake mechanism, the operating variable of the engine speed adjusting mechanism is above the predetermined value.

5. A system as set forth in claim 1, wherein the engine speed adjusting mechanism is an engine throttle valve.

6. A system as set forth in claim 5, wherein the mechanism linked to the engine speed adjusting mechanism is an accelerator pedal.

7. A system as set forth in claim 6, wherein the second means includes a switch having opposing contacts located in a space between a pad of the accelerator pedal and a link of the accelerator pedal connected to the throttle valve with a return spring intervened therebetween.

8. A system as set forth in claim 6, wherein the fourth means includes seventh means for detecting an engine revolution speed and wherein the fourth means detects the gear position according to the engine speed and vehicle speed.

9. A system as set forth in claim 6, wherein the fourth means detects the gear position according to an opening angle and vehicle speed.

10. A method for automatically controlling a vehicle speed to a desired cruise speed, comprising:

a) controlling the vehicle to run at a target cruise speed in a feedback control mode such that an operating variable of an engine speed adjusting mechanism installed in a vehicular engine is controlled so that an actual vehicle speed coincides with the target vehicle speed;

b) detecting the operating variable of the engine speed adjusting mechanism;

c) detecting whether a mechanism linked to the engine speed adjusting mechanism is manipulated;

d) detecting the actual vehicle speed;

e) detecting a gear position of a vehicular transmission;

f) detecting whether a vehicular brake mechanism is manipulated; and g) determining whether any one of the following conditions is established and halting the operation of the control apparatus when determining that any one of the following conditions is established, the conditions being that (1) the vehicle speed is below a predetermined speed value, (2) the gear position of the transmission is placed in a low-speed gear range or in a reverse range , (3) the operating variable of the engine speed adjusting mechanism is small and is below a predetermined value, (4) a time for which the vehicle speed is above the predetermined speed value is continued within a predetermined time, (5) it is within a predetermined time from a time at which the gear position is placed in a neutral position to a time at which the gear position is placed in a drive range, (6) it is within a predetermined time upon the drive to produce the operating variable of the engine speed adjusting mechanism, and (7) with no operation of the mechanism linked to the engine speed adjusting mechanism and with the operation of the brake mechanism, the operating variable of the engine speed adjusting mechanism is above the predetermined value.

11. A system for automatically controlling a vehicle speed to a desired cruise speed, comprising:

a) a control apparatus for controlling the vehicle to run at a target cruise speed in a feedback control mode such that an operating variable of an engine speed adjusting mechanism installed in a vehicular engine is controlled so that an actual vehicle speed coincides with the target vehicle speed;

b) first means for detecting the operating variable of the engine speed adjusting mechanism;

c) second means for detecting whether a mechanism linked to the engine speed adjusting mechanism is manipulated;

d) third means for detecting the actual vehicle speed;

e) fourth means for detecting a gear position of a vehicular transmission;

f) fifth means for detecting whether a vehicular brake mechanism is manipulated;

g) sixth means for determining whether any one of the following conditions is established and halting the operation of the control apparatus when determining that any one of the following conditions is established, the conditions being that (1) the vehicle speed is below a predetermined speed value, (2) the gear position of the transmission is placed in a shift range except a high-speed gear range, (3) the operating variable of the engine speed adjusting mechanism is small and is below a predetermined value, (4) a time for which the vehicle speed is above the predetermined speed value is continued within a predetermined time, (5) it is within a first predetermined time from a time at which the gear position is placed in a neutral position to a time at which the gear position is placed in a range except a reverse range, low-speed gear range, and a parking range, (6) it is within a second predetermined time upon the drive to produce the operating variable of the engine speed adjusting mechanism, and (7) with no operation of the mechanism linked to the engine speed adjusting mechanism and with the operation of the brake mechanism, the operating variable of the engine speed adjusting mechanism is above the predetermined value.

12. A system for automatically controlling a vehicle speed to a desired cruise speed, comprising:
   a) a control apparatus for controlling the vehicle to run at a target cruise speed in a feedback control mode such that an operating variable of an engine speed adjusting mechanism installed in a vehicular engine is controlled so that an actual vehicle speed coincides with the target vehicle speed;
   b) first means for detecting the operating variable of the engine speed adjusting mechanism;
   c) second means for detecting whether a mechanism linked to the engine speed adjusting mechanism is manipulated;
   d) third means for detecting the actual vehicle speed;
   e) fourth means for detecting a gear position of a vehicular transmission;
   f) fifth means for detecting whether a vehicular brake mechanism is manipulated;
   g) sixth means for determining whether any one of the following conditions is established and halting the operation of the control apparatus when determining that any one of the following conditions is established, the conditions being that (1) the vehicle speed is below a predetermined speed value, (2) the gear position of the transmission is placed in a shift range except a high-speed gear range, (3) the operating variable of the engine speed adjusting mechanism is small and is below a predetermined value, (4) a time for which the vehicle speed is above the predetermined speed value is continued within a predetermined time, (5) it is within a first predetermined time from a time at which the gear position is placed in a neutral position to a time at which the gear position is placed in a predetermined range except a the neutral gear position, (6) it is within a second predetermined time upon the drive to produce the operating variable of the engine speed adjusting mechanism, and (7) with no operation of the mechanism linked to the engine speed adjusting mechanism and with the operation of the brake mechanism, the operating variable of the engine speed adjusting mechanism is above the predetermined value.

13. A system for automatically controlling a vehicle speed to a desired cruise speed, comprising:
   (a) a control apparatus for controlling the vehicle to run at a target cruise speed in a feedback control mode such that an operating variable of an engine speed adjusting mechanism installed in a vehicular engine is controlled so that an actual vehicle speed coincides with the target vehicle speed;
   (b) first means for detecting the operating variable of the engine speed adjusting mechanism;
   (c) second means for detecting whether a mechanism linked to the engine speed adjusting mechanism is manipulated;
   (d) third means for detecting the actual, vehicle speed;
   (e) fourth means for detecting a gear position of a vehicular transmission;
   (f) fifth means for detecting whether a vehicular brake mechanism is manipulated; and
   (g) sixth means receiving signals indicative of each of the following conditions and for determining whether any one of the following conditions is established and halting the operation of the control apparatus when determining that any one of the following conditions is established; the conditions being that (1) the vehicle speed is below a predetermined speed value, (2) the gear position of the transmission is placed in a low- speed gear range or in a reverse range, (3) the operating variable of the engine speed adjusting mechanism is small and is below a predetermined value, (4) a time for which the vehicle speed is above the predetermined speed value is continued within a predetermined time, (5) it is within a predetermined time from a time at which the gear position is placed in a neutral position to a time at which the gear position is placed in a drive range, (6) it is within a predetermined time upon the drive to produce the operating variable of the engine speed adjusting mechanism, and (7) with no operation of the mechanism linked to the engine speed adjusting mechanism and with the operation of the brake mechanism, the operating variable of the engine speed adjusting mechanism is above the predetermined value.

14. A system as set forth in claim 13 wherein said sixth means includes means for generating a cut-off signal for terminating operation of the control apparatus when any one of said conditions is established.

* * * * *